J. LEE.
Post-Hole Digger.
No. 28,874
Patented June 26, 1860.
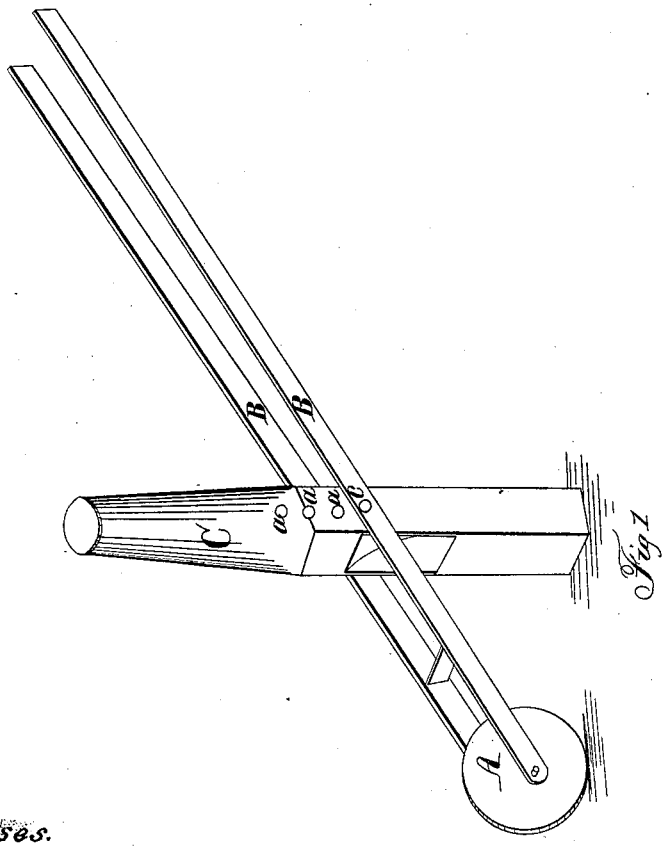
Witnesses.
J. Pigott.
Jos. C. Clayton
Inventor.
John Lee

UNITED STATES PATENT OFFICE.

JOHN LEE, OF BOLIVAR, OHIO.

IMPROVEMENT IN POST-HOLE DIGGERS.

Specification forming part of Letters Patent No. 28,874, dated June 26, 1860.

*To all whom it may concern:*

Be it known that I, JOHN LEE, of Bolivar, Tuscarawas county, in the State of Ohio, have invented new and useful Improvements in Post-Hole Diggers; and I do hereby declare that the following is a full and exact description thereof, reference being had to the accompanying drawings, and to the letters of reference marked thereon.

To enable others skilled in the art to make and use my invention, I will proceed to describe its construction and operation.

Figure 1 is a perspective view of the invention. Fig. 2 is a vertical section of the machine. C is the continuous digger.

In Fig. 1, C is the digger; D, the opening in the digger, through which is the escape of dirt when the digger is filled below the opening. The digger is made of any suitable material, and may be made hollow for lightness; or, if more convenient, the upper end above the levers may be made solid. The lower end is made square and hollow, with sharp cutting-edges at the lower end, and of any required length. The opening D is from eighteen to thirty inches from the cutting-edges, and is as wide as the inner side of the digger, and extends up high enough to allow the earth to escape readily from the digger.

The wheel A may be of any required diameter and the levers B of any required length. The levers have in them pivots *b*, which catch into holes *a* of digger, and as the levers have sufficient spring in them those pivots can be readily changed to any one of the holes *a*, as required.

In operating my invention, when I wish to dig a hole the digger is set at the point desired for the hole, and then with a suitable maul or driver the digger is driven down into the ground to the required depth, cutting out the earth and leaving it in the digger. I then take hold of the levers B and raise the digger out of the ground, lifting the dirt out with it, the wheel acting as the fulcrum of the levers, and move it forward to the next place where the hole is to be dug, when the digger is driven down as before, and the earth in the digger of the first hole is forced out at the opening D, leaving, as before described, the dirt only of the hole in the digger. I thus proceed as before, digging the holes and cleaning the digger, as described.

I find by this invention I can dig a post-hole in a much shorter space of time and at much less expense than by any other mode heretofore known.

Having thus described the nature of my invention, what I claim as new, and desire to secure by Letters Patent, is—

1. The hollow self-discharging digger, constructed and operating as set forth.

2. The wheel A and levers B, in combination with the digger C, operating as described, and for the purposes set forth.

JOHN LEE.

Witnesses:
    J. PIGOTT,
    JOS. C. CLAYTON.